Jan. 28, 1947.   H. H. GRUND   2,414,945
LARIAT HONDA
Filed Oct. 26, 1945

Inventor
HERBERT H. GRUND,

Attorneys

Patented Jan. 28, 1947

2,414,945

UNITED STATES PATENT OFFICE 2,414,945

LARIAT HONDA

Herbert H. Grund, Fishtail, Mont.

Application October 26, 1945, Serial No. 624,839

2 Claims. (Cl. 35—8)

This invention relates to a lariat honda, and more particularly to such a device characterized by split means, whereby the same may be readily released after an object is caught by a rope, and particularly adaptable for practice roping.

A primary object of the invention is the provision of an improved lariat honda, split at its upper extremity, and comprised of relatively resilient material, whereby the exertion of any pressure thereon, as by the rope when an object is caught, will permit the same to readily release.

A further object of the invention is the provision of an improved honda particularly adaptable for practice roping, whereby an object may be lassoed by a rope or the like, and may be substantially automatically released when any pressure is exerted on the lariat.

Still another object of the invention is the provision of such a device which will be sturdy and durable in construction, reliable and efficient in operation, and relatively simple and inexpensive to manufacture, assemble and utilize.

Other objects will in part be obvious, and in part be pointed out as the description of the invention proceeds, and shown in the accompanying drawing wherein there is disclosed a preferred embodiment of this inventive concept.

In the drawing.

Similar reference characters refer to similar parts throughout the several views of the drawing.

Figure 1:
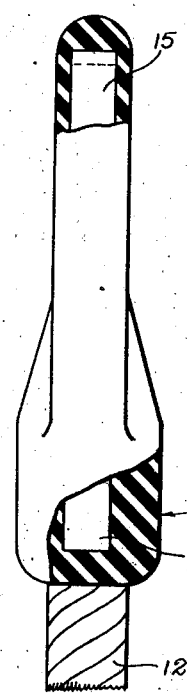
Figure 1 is a side view, partially in elevation, and partially in section, of one form of honda embodying features of the instant inventive concept.
Figure 2:
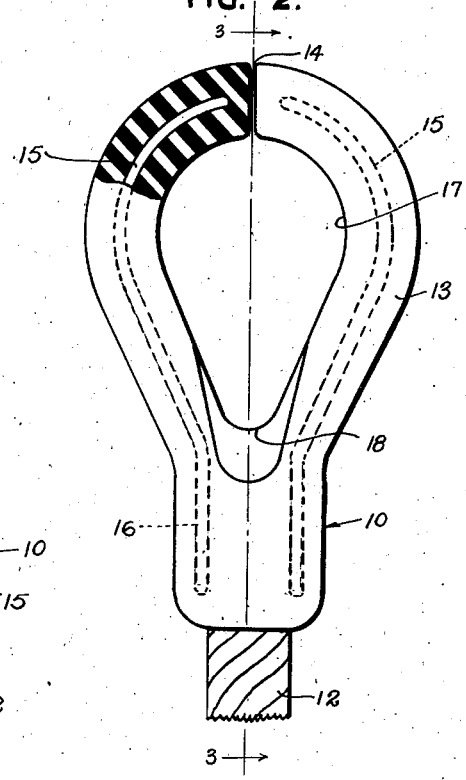
Figure 2 is a front view, partially in elevation, and partially in section, of the device disclosed in Figure 1.
Figure 3:
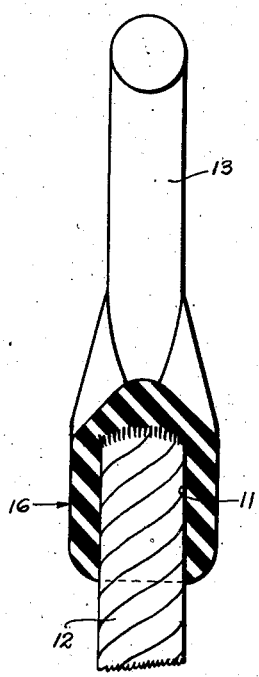
Figure 3 is a sectional view taken substantially on the line 3—3 of Figure 2, as viewed in the direction indicated by the arrows.

Having reference now to the drawing, the honda of the instant invention is comprised of an enlarged substantially cylindrical portion 10 provided interiorly with a socket 11, in which is secured the extremity of a rope or lariat 12. Extending upwardly from the tubular socket portion 10 are a pair of arcuate arms 13, which terminate in juxtaposition to each other to form a slot 14 at the top of the device. The arms 13 are preferably comprised of suitable resilient material, such as a plastic, as for example, the phenolic resin type, and have imbedded centrally thereof arcuate leaf springs 15, preferably comprised of steel or the like, and so designed as to enhance the resiliency of the arms 13, as well as reinforce and strengthen the same. The springs 15 are provided with extending extremities 16 which extend downwardly into the sides of the socket portion 10 on opposite sides of the rope 12.

The arcuate arms 13 provide interiorly thereof an aperture 17, through which a rope is adapted to pass, and are beveled at their juncture with the socket portion 10, as indicated at 18, to provide a smooth friction surface over which the rope may slide.

Figure 4:
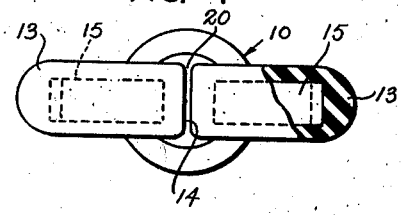
Figure 4 is a top plan view, partially broken away, of the device disclosed in Figures 1 to 3, inclusive.

As best shown in Figure 4, the extremities of the slot 14 transversely are beveled, as at 20, to permit the ready and facile passage of a rope therethrough, when pressure is exerted thereon, as by lassoing for capturing an object, such as an animal.

From the foregoing the operation and method of use of the device should now be readily understandable. The opposite end of the rope 12 is passed through the aperture 17, to form a lasso or lariat. In utilizing the device, it will be readily understood that the lariat is cast in the conventional manner, but that when the device surrounds an object, as for example, the neck of an animal, and pressure is exerted thereon, the resilient arms 13 with their reinforcing springs 15 separate to enlarge the slot 14 to permit the passage of the rope 12 therethrough, thus releasing the object lassoed.

From the foregoing it will now be seen that there is herein provided an improved honda, which serves satisfactorily to retain the rope, or the lariat, or the like, during the roping operation, but which, through its resilient and slotted construction, is adapted to release the object immediately upon the exertion of pressure against the honda, whereupon the lariat may be reassembled and utilized repeatedly for practice throws as may be desired.

From the foregoing it will now be seen that there is herein provided an improved device accomplishing all the objects of this invention and others, including many advantages of great practical utility and commercial importance.

Since many embodiments may be made of this inventive concept, and as many modifications may be made in the embodiment hereinbefore shown and described, it is to be understood that all matter herein is to be interpreted merely as illustrative and not in a limiting sense.

I claim:

1. A honda for lariats and the like comprising a split eye of relatively heavy resilient material with a shank having a rope holding socket in the outer end thereof, said eye portion formed of two outwardly extending fingers with the ends thereof curved inward to a common point on a centrally disposed line passing through the said shank, the ends of said fingers being in abutting relation apparently completing the said eye.

2. A honda for lariats and the like comprising a split eye of relatively heavy resilient material with a shank having a rope holding socket in the outer end thereof, said eye portion formed of two outwardly extending fingers with the ends thereof curved inward to a point on a centrally disposed line passing through the center of said shank, the ends of said fingers positioned in abutting relation apparently completing the said eye, and resilient members imbedded in said fingers with the ends thereof spaced from the ends of the fingers and with the opposite ends extending into the said shank on opposite sides of the said socket.

HERBERT H. GRUND.